(12) United States Patent
Quint et al.

(10) Patent No.: US 11,913,796 B2
(45) Date of Patent: Feb. 27, 2024

(54) DESTINATION REACHABILITY VIA PUBLIC CHARGING LOCATIONS

(71) Applicant: Rivian IP Holdings, LLC, Plymouth, MI (US)

(72) Inventors: Jason Meyer Quint, Ann Arbor, MI (US); Kok Wei Koh, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 18 days.

(21) Appl. No.: 17/386,801

(22) Filed: Jul. 28, 2021

(65) Prior Publication Data
US 2023/0032381 A1    Feb. 2, 2023

(51) Int. Cl.
| | |
|---|---|
| *G01C 21/34* | (2006.01) |
| *G07C 5/00* | (2006.01) |
| *B60L 58/12* | (2019.01) |
| *G01C 21/36* | (2006.01) |

(52) U.S. Cl.
CPC .......... *G01C 21/3476* (2013.01); *B60L 58/12* (2019.02); *G01C 21/3697* (2013.01); *G07C 5/004* (2013.01)

(58) Field of Classification Search
None
See application file for complete search history.

(56) References Cited

U.S. PATENT DOCUMENTS

| | | | | |
|---|---|---|---|---|
| 2010/0094496 A1* | 4/2010 | Hershkovitz | ........... | B60L 53/14 701/22 |
| 2011/0313610 A1* | 12/2011 | Riegelman | ............ | B60W 40/12 701/34.4 |
| 2012/0179311 A1* | 7/2012 | Skaff | ...................... | H02J 7/0048 180/65.21 |
| 2013/0096751 A1* | 4/2013 | Riley | ...................... | B60L 53/65 706/46 |
| 2013/0173097 A1* | 7/2013 | Jotanovic | ........... | G01C 21/3469 701/1 |
| 2014/0172282 A1* | 6/2014 | Feng | ....................... | B60L 58/12 701/123 |

(Continued)

FOREIGN PATENT DOCUMENTS

WO    WO-2011163623 A1 * 12/2011    .......... B60L 11/1838

OTHER PUBLICATIONS

Machine Translation of WO-2011163623-A1 (Year: 2011).*

*Primary Examiner* — Anne Marie Antonucci
*Assistant Examiner* — Kyle S Park
(74) *Attorney, Agent, or Firm* — PATTERSON + SHERIDAN, LLP

(57) ABSTRACT

Disclosed embodiments include computer-implemented methods, systems, and vehicles for determining a travel range of a vehicle. In an illustrative embodiment, a perimeter is determined indicating a travel range of a vehicle from a starting location based on the capacity of the battery system. At least one charging location is identified within the perimeter. An option is provided to generate an extended perimeter indicating an extended travel range of the vehicle travel from the starting location based on a recharge of the battery system at the at least one charging location. Map data is generated including at least one visualized travel range chosen from the perimeter and the extended perimeter.

17 Claims, 18 Drawing Sheets

(56) References Cited

U.S. PATENT DOCUMENTS

| | | | |
|---|---|---|---|
| 2015/0226566 A1* | 8/2015 | North | B60L 53/68 |
| | | | 701/428 |
| 2017/0074677 A1* | 3/2017 | MacNeille | G01C 21/3469 |
| 2019/0204840 A1* | 7/2019 | Park | G01C 21/3667 |
| 2019/0383637 A1* | 12/2019 | Teske | B60L 53/14 |
| 2021/0300181 A1* | 9/2021 | Sakai | G01C 21/3469 |

\* cited by examiner

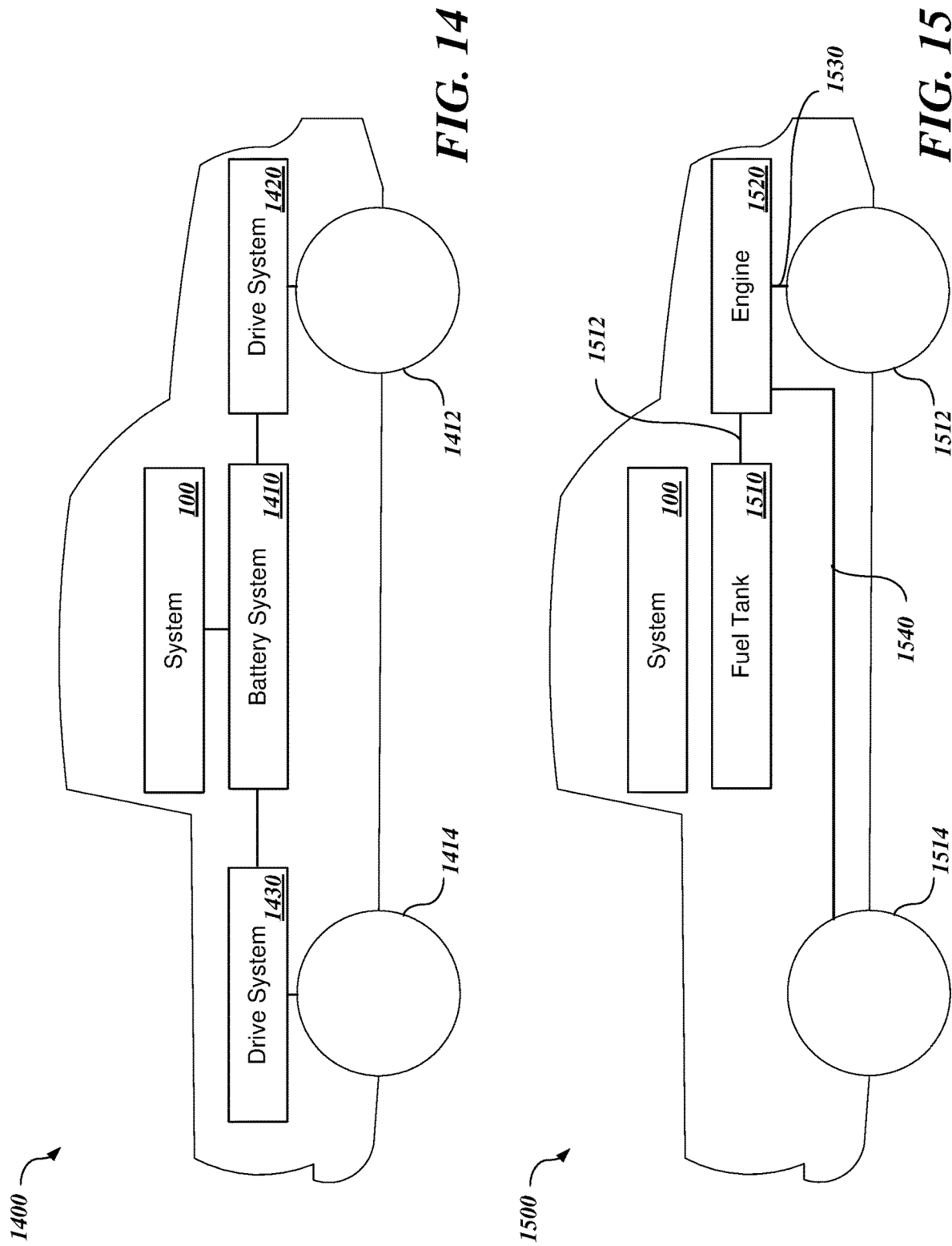

DESTINATION REACHABILITY VIA PUBLIC CHARGING LOCATIONS

INTRODUCTION

Navigational systems, such as handheld systems or systems integrated into vehicles, provide navigational assistance in reaching a selected destination, such as by estimating a distance or time to a destination. Being able to determine distance to a destination may be of particular interest to operators of electric vehicles. Public charging locations may not be as ubiquitous as gas stations and, thus, a range of travel that an electric vehicle can travel on available battery power may be important to its operator.

SUMMARY

Disclosed embodiments include computer-implemented methods, systems, and vehicles for determining and visualizing a travel range of a vehicle.

In an illustrative embodiment, a method includes determining a perimeter indicating a travel range of a vehicle from a starting location based on a capacity of the battery system. At least one charging location is identified within the perimeter. An option is provided to generate an extended perimeter indicating an extended travel range of the vehicle travel from the starting location based on a recharge of the battery system at the at least one charging location. Map data is generated including at least one visualized travel range chosen from the perimeter and the extended perimeter.

In another illustrative embodiment, a system includes a computing device including a processor and computer-readable media configured to store computer-executable instructions configured to cause the processor to perform a plurality of instructions. A perimeter is identified indicating a travel range of a vehicle from a starting location based on a capacity of the battery system. At least one charging location is identified within the perimeter. An extended perimeter is generated indicating an extended travel range of the vehicle travel from the starting location based on a recharge of the battery system at the at least one charging location. Map data is generated including at least one visualized travel range chosen from the perimeter and the extended perimeter.

In another illustrative embodiment, a vehicle includes a cabin, a drive system, and a computing device including a processor and computer-readable media configured to store computer-executable instructions configured to cause the processor to perform a plurality of instructions. A perimeter is identified indicating a travel range of a vehicle from a starting location based on a capacity of the battery system. At least one charging location is identified within the perimeter. An extended perimeter is generated indicating an extended travel range of the vehicle travel from the starting location based on a recharge of the battery system at the at least one charging location. Map data is generated including at least one visualized travel range chosen from the perimeter and the extended perimeter.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 14 and 15 are block diagrams in partial schematic form of an electrically-powered vehicle and an internal combustion engine-powered vehicle, respectively, that may be equipped with the system of FIGS. 1 and 3-12;

DETAILED DESCRIPTION

The following description explains, by way of illustration only and not of limitation, various embodiments.

By way of a non-limiting introduction and overview, in various embodiments a computer-implemented method and a system (which may be integrated with a vehicle) are configured to determining a travel range of a vehicle. In an illustrative embodiment, a perimeter is determined indicating a travel range of a vehicle from a starting location based on a capacity of the battery system. At least one charging location is identified within the perimeter. An option is provided to generate an extended perimeter indicating an extended travel range of the vehicle travel from the starting location based on a recharge of the battery system at the at least one charging location. Map data is generated including at least one visualized travel range chosen from the perimeter and the extended perimeter. Now that a general overview has been given, details of various embodiments will be explained by way of non-limiting examples given by way of illustration only and not of limitation.

Figure 1:
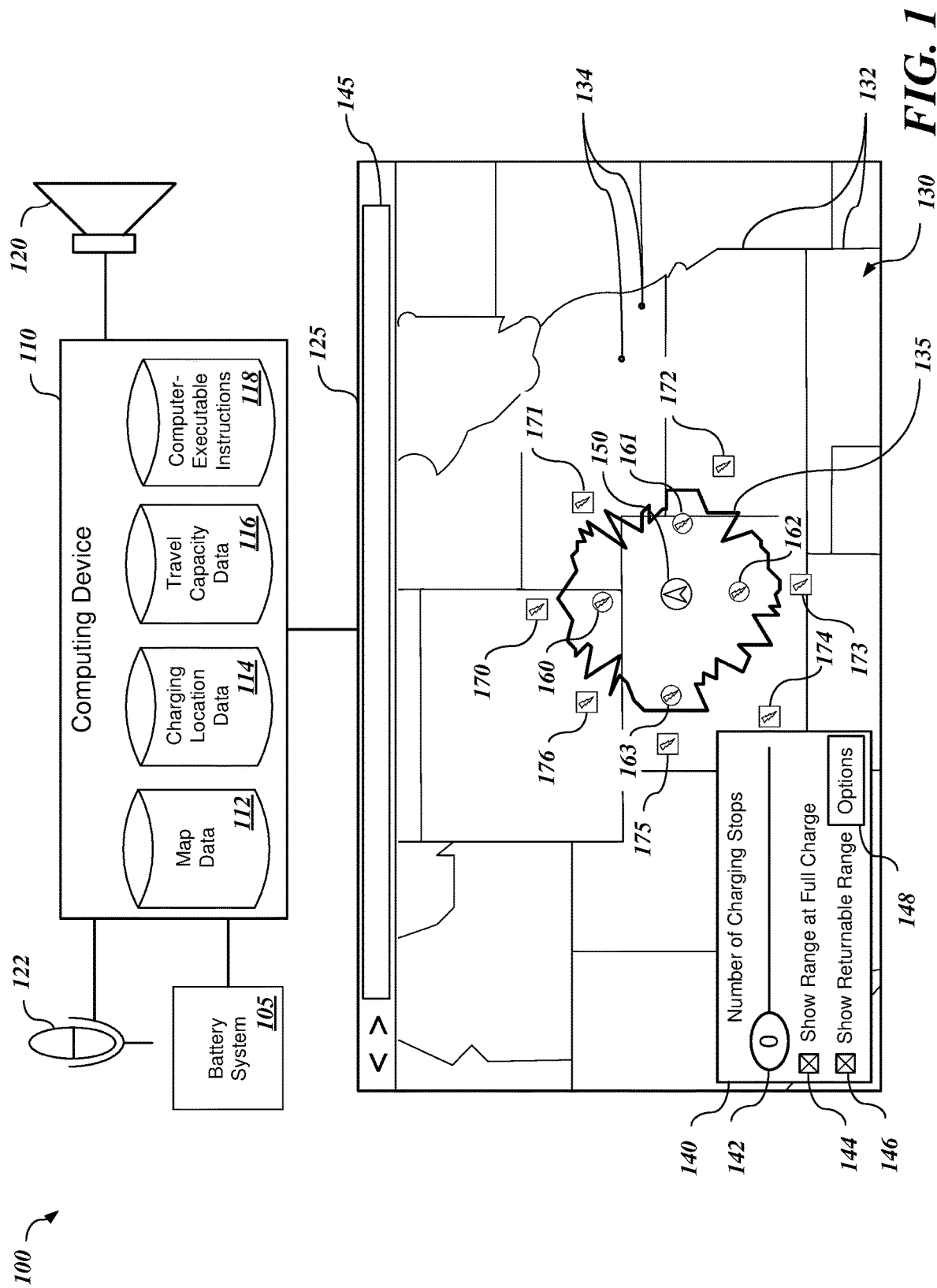
FIGS. 1 and 3-12 are block diagrams of an illustrative system and illustrative screen displays for a system that determines and visualizes travel ranges of a vehicle.

Referring to FIG. 1, an illustrative system 100 includes a computing device 110 operated according to computer-executable instructions to cause the computing device 110 to determine a travel range of a vehicle and related functions as described herein. The computing device 110 may include a computer system with a processor, memory, storage, and other devices, as further described below with reference to FIG. 17. In determining the travel range of the vehicle, the computing device 110 includes memory and/or storage that maintains map data 112, charging location data 114 (which, in various embodiments, may be included in or incorporated in the map data 112), travel capacity data 116, and computer-executable instructions 118 to cause the computing device 110 to perform functions herein described. As further described below, the computing device 110 may include a computing device incorporated in a vehicle or a standalone computing device such as a desktop computer, a portable computer, a tablet computer, a smartphone, a wearable device, or another computing device. As will be appreciated, the systems, vehicles, and computer-implemented methods described herein perform functions that may be desired by a user of a vehicle, a prospective purchaser or lessee of a vehicle, vehicle fleet or operations planners and managers, or other users.

The map data 112 may include roadway data that may be used to determine potential routes as well as information about the roadways, including speed limits and whether the roadways include highways, freeways, and/or surface streets that may be used in determining likely travel efficiency. In various embodiments, the map data 112 also may include traffic data that may affect travel efficiency. In various embodiments, the map data 112 also may include terrain and/or surface data that also may affect travel efficiency and, thus, the travel range of a vehicle on these roadways.

The charging location data 114 includes data about publicly accessible charging locations. In various embodiments, the charging location data 114 includes the location of publicly available charging locations and/or navigational information to reach the charging locations. In various embodiments, the charging location data 114 may include information that may affect charging speeds, as described further below with reference to FIG. 8. Data about the charging locations may be used in determining the travel range of the vehicle when a user plans one or more charging stops during travel. In various embodiments, the charging location data 114 may be combined with or be incorporated in the map data 112.

The travel capacity data 116 may include information usable by the computing device 110 in determining the travel range of the vehicle. In various embodiments, the travel capacity data 116 stores data about the vehicle's energy usage and efficiency. In various embodiments, the travel capacity data includes information about the vehicle's energy usage at different speeds, on different types of roadways (e.g., freeways, highways, and surface streets, etc.), and over different terrain (e.g., flat terrain, climbing hills, descending hills, etc.). Combined with the map data 112, the travel capacity data 116 may provide a detailed determination of the travel range of the vehicle on different types of roadways to various possible destinations, as further described below.

In various embodiments, the computer-executable instructions 118 include the instructions used by the computing device 110 in determining the travel range possible using the map data 112, charging location data 114, and travel capacity data 116.

In various embodiments, the computing device 110 is in communication with a display 125. In various embodiments, the display 125 is an interactive touchscreen device capable of providing output from and receiving input to the computing device 110. In various embodiments, the computing device 110 also may be in communication with a noninteractive display that receives input from a keyboard, pointing device, or other input devices (not shown in FIG. 1). In various embodiments, the computing device 110 also may include an audio input interface 122, such as a microphone, to receive verbal input. The computing device 110 also may include an audio output interface 120, such as a speaker, to provide audible output.

In various embodiments, the computing device 110 is communicatively coupled with a battery system 105 of a vehicle (not shown in FIG. 1) so that an evaluation of a current capacity of the battery system 105 may be made to determine a travel range of the vehicle based on its current charge status. When the computing device 110 is integrated with the vehicle, the computing device 110 may be directly coupled to the battery system 105. In other embodiments, the computing device 110 may be communicatively coupled with the battery system 105 via a computing device aboard or another device aboard the vehicle that is coupled with the battery system 105. As further described below, it will be appreciated that communication with the battery system 105 may not be needed when the computing device 110 is used to determine a travel range of the vehicle when it is assumed the battery system 105 holds a full charge.

In various embodiments, the display 125 presents a map 130 that includes geographical information, such as state or other borders 132, locations of municipalities such as cities and towns 134, and roadways (not shown in FIG. 1).

Presented on the map 130 is a perimeter 135 representing a travel range of the vehicle. The travel range is based on a battery level of the vehicle which the computing system 110 may determine from communication with the battery system 105. The perimeter 135 represents a locus of maximum distance the vehicle can travel along roadways extending from a starting location 150, as further described below with reference to FIG. 2. In various embodiments, a charging control interface 140 is presented to enable a user to determine the travel range of the vehicle based on available energy and/or with one or more stops at charging locations to recharge the battery.

In various embodiments, the charging control interface 140 includes a charging selector 142 that is configured to enable an operator to specify a number of charging stops (e.g., one or more charging stops) to be included to help determine the travel range of the vehicle. In various embodiments, the charging selector 142 includes a "slider" type input that a user may manipulate by sliding a digit (not shown) across the charging selector 142 on the display 125. In various embodiments, the charging selector 142 also may include a different tactile input manipulatable by a digit, via a voice input receivable via the audio input interface 122, or another form of input.

In various embodiments, the charging control interface 140 also may include a full charge range option 144. The full charge range option 144 determines whether the travel range is determined based on a full charge of the battery system 105, a current charge level of the battery system 105, or another specified charge level of the battery system 105. The returnable range option 146 determines whether the travel range is computed to leave enough charge to reach a known charging location or to return to the current location. An options selection 148 enables a user to specify other options regarding charging of the vehicle, as further described below. In the example of FIG. 1, the selection (represented by an "X") of the full charge option 144 indicates that the travel range represented by the perimeter 135 shows the travel range of the vehicle based on a fully charged battery while leaving enough charge in the battery system so that, after reaching the perimeter 135, the vehicle is able to reach an available charging location.

In various embodiments, the computing system 110 identifies from the charging location data 114 charging locations 160-163 and 170-176 to be included in map data presentable via the map 130. In various embodiments, the map 130 includes charging locations 160-163 within the perimeter 135 that are reachable by the vehicle traveling from the starting location 150 without stopping to charge the vehicle. In various embodiments, the map 130 includes charging locations 170-176 outside of the perimeter 135. The charging locations 170-176 may be reachable by the vehicle traveling from the starting location 150 if the vehicle stops at one of the charging locations 160-163 to at least partially charge the battery system 105. In various embodiments, the charging locations 160-163 that are within the perimeter 135 and, thus, can be reached without stopping to at least partially charge the battery system, are represented with a circular symbol in the figures. By contrast, the charging locations 170-176 that are outside the perimeter 135 and, thus, would require a stop within the perimeter 135 to at least partially charge the battery system, are represented with a square symbol in the figures. It will be appreciated that, in various embodiments, the charging locations 160-163 within the perimeter 135 and the charging locations 170-176 may be visually distinguished in other ways, such as by using other different shapes, different colors, dotted or dashed outlines, "graying" or otherwise reducing the intensity of the charging locations 170-176 outside of the perimeter 135, etc. Thus, according to various embodiments, at a glance, a user can view the perimeter 135 to visualize the travel range of the vehicle from the starting location 150, including any charging locations 160-163, borders 132, municipalities 134, or other locations that are encompassed within the perimeter 135. By contrast, a user can ascertain what locations are outside of the perimeter 135 that would entail one or more charging stops to charge the battery system 105 for the vehicle to travel from the starting location 150 to these locations.

Figure 2:
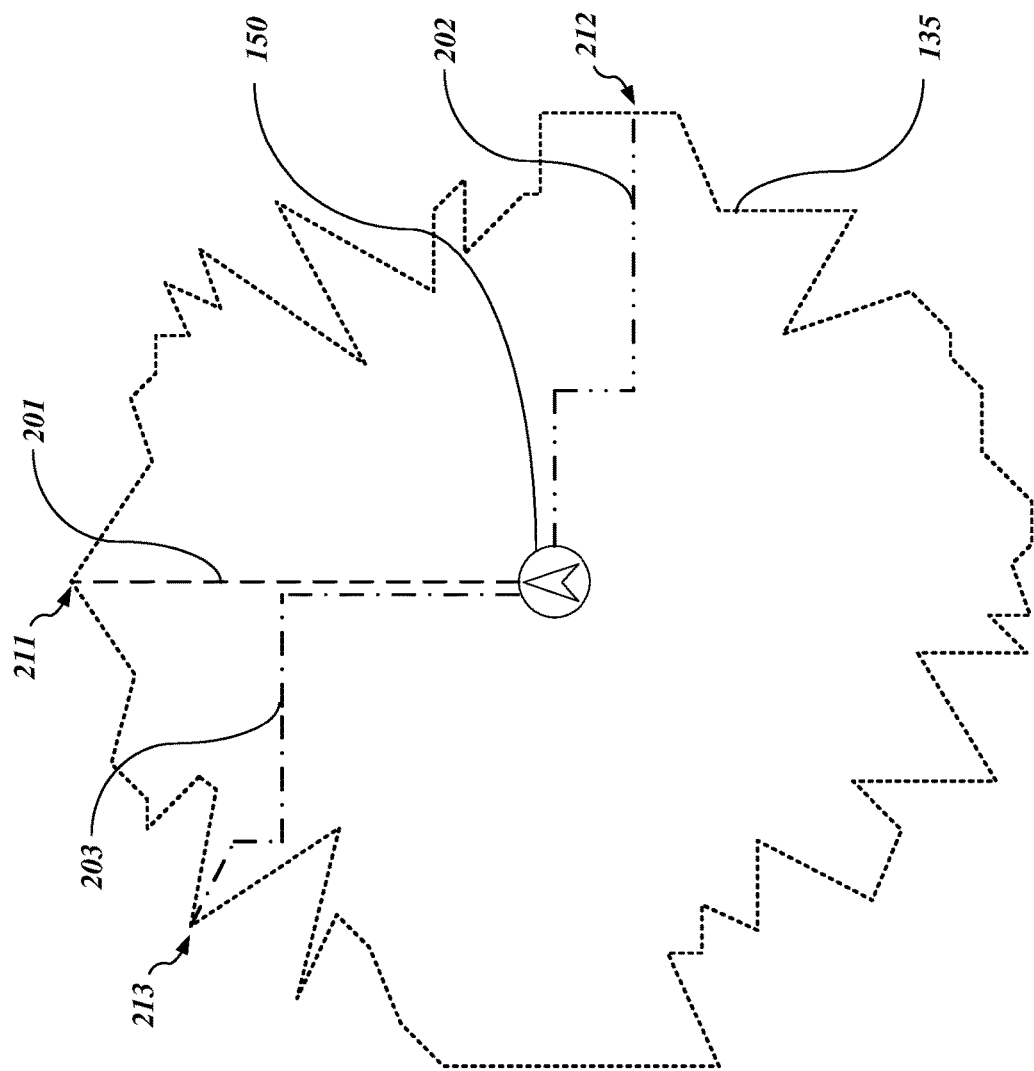
FIG. 2 is a schematic diagram of generation of edges of a perimeter that defines a travel range of the vehicle.

Referring additionally to FIG. 2, in various embodiments the perimeter 135 includes a locus of points representing the travel range of the vehicle reachable on the available roadways from the starting location 150 based on the vehicle's available energy. In various embodiments, the computing device 110 (FIG. 1) may plot some, most, or all of the possible routes away from the starting location 150 across freeways, highways, surface streets, or other known roadways in the map data 112 (FIG. 1). With the available power of the battery system 105 (FIG. 1), using the travel capacity data 116, the computing device 110 determines how far the vehicle can travel from the starting location along each of the routes based on the travel distance including turns and other aspects of each of the routes. By way of example, FIG. 2 shows three plotted routes 201-203 that end at three endpoints 211-213. The first route 201 is a straight route from the travel location 150 that ends at endpoint 211 where the computing device determines that the capacity of the battery system 105 would be exhausted. The second route 202 and the third route 203 both include multiple turns. The second route 202 and third route 203 end at endpoints 212 and 213, respectively, where the computing device 110 determines that the capacity of the battery system 105 would be exhausted.

In various embodiments the perimeter 135 that represents the travel range is a locus or collection of all such endpoints for routes from the starting location 150. The collection of the endpoints 211, 212, and 213 determine the edges of the perimeter 135 that may be connected to complete the perimeter 135. As previously described with reference to FIG. 1, because the returnable range option 146 was selected, the perimeter 135 defines a range that leaves enough charge for the vehicle to reach a known publicly accessible charging location before its charge is exhausted.

Figure 3:
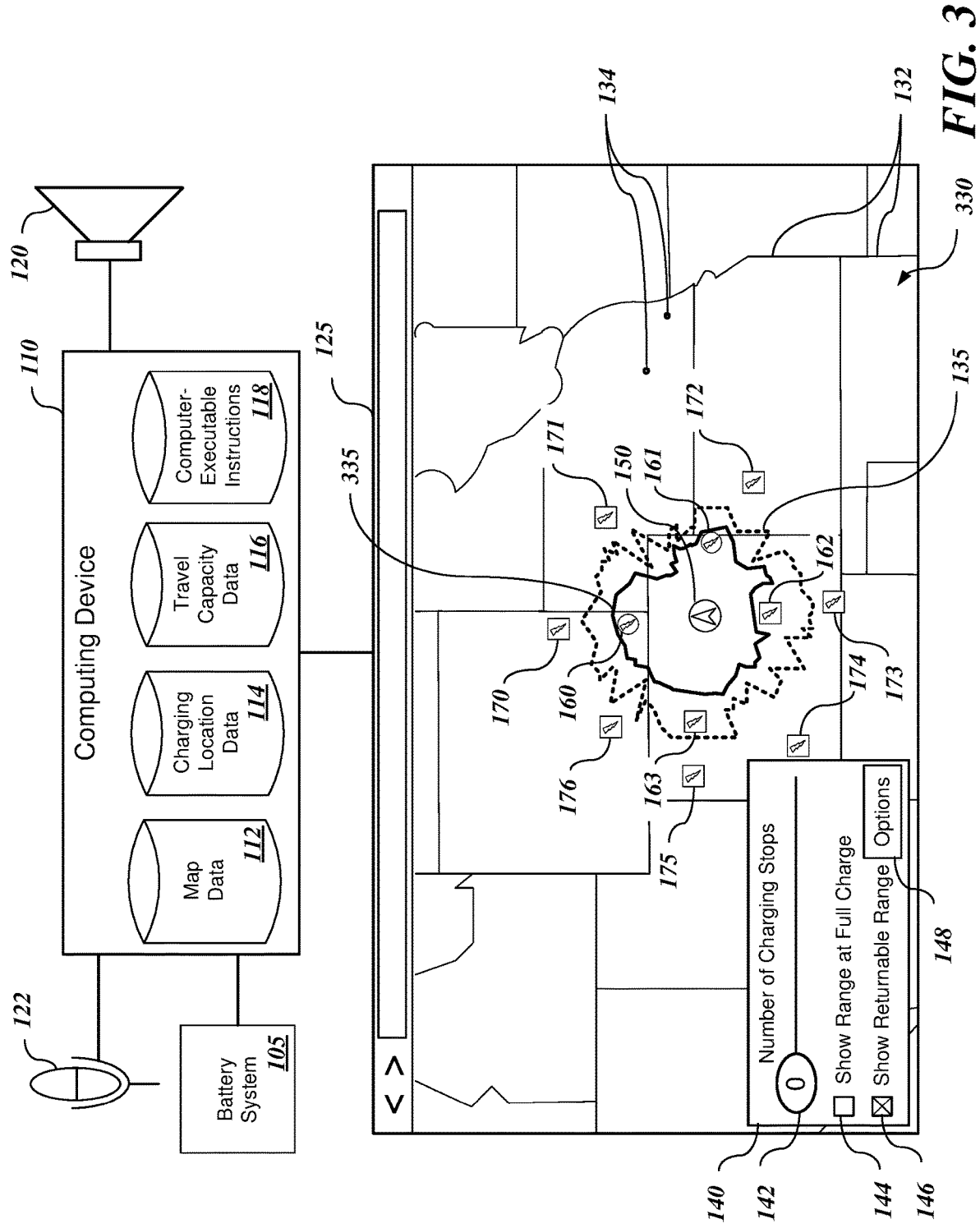

Referring additionally to FIG. 3, the range at full charge option 144 is deselected. In various embodiments, deselecting the range at full charge option 144 then determines the travel range based on a current charge level of the battery system 105. In the example of FIG. 3, the current charge level is less than a full charge level of the battery system 105. As a result, the map 330 includes a perimeter 335 that represents the travel range based on the current charge level of the battery system 105. Because the current charge level is less than a full charge level, the travel range represented by the perimeter 335 is less than the travel range defined by the perimeter 135 (now represented with a dotted line for contrast with the perimeter 335) based on a full charge. Thus, in various embodiments as depicted in FIG. 3, the map 330 may visually represent the travel range of the vehicle from the starting point 150 with the perimeter 335 based on the current charge of the battery system 105 and/or the travel range of the vehicle from the starting point 150 with the perimeter 135 based on a full charge level.

Because the travel range based on a current charge level of the battery system 105 may be less than the travel range based on a full charge level of the battery system 105, some of the charging locations within the original perimeter 135 may not be within the perimeter 335. Thus, visual representation of some charging locations, such as charging locations 162 and 163 (FIG. 1) that were within the travel range represented by the perimeter 135, is changed to dotted lines (as shown in FIG. 3) or otherwise changed to show that the charging locations 162 and 163 are no longer within the travel range of the vehicle without recharging the battery system 105.

Figure 4:
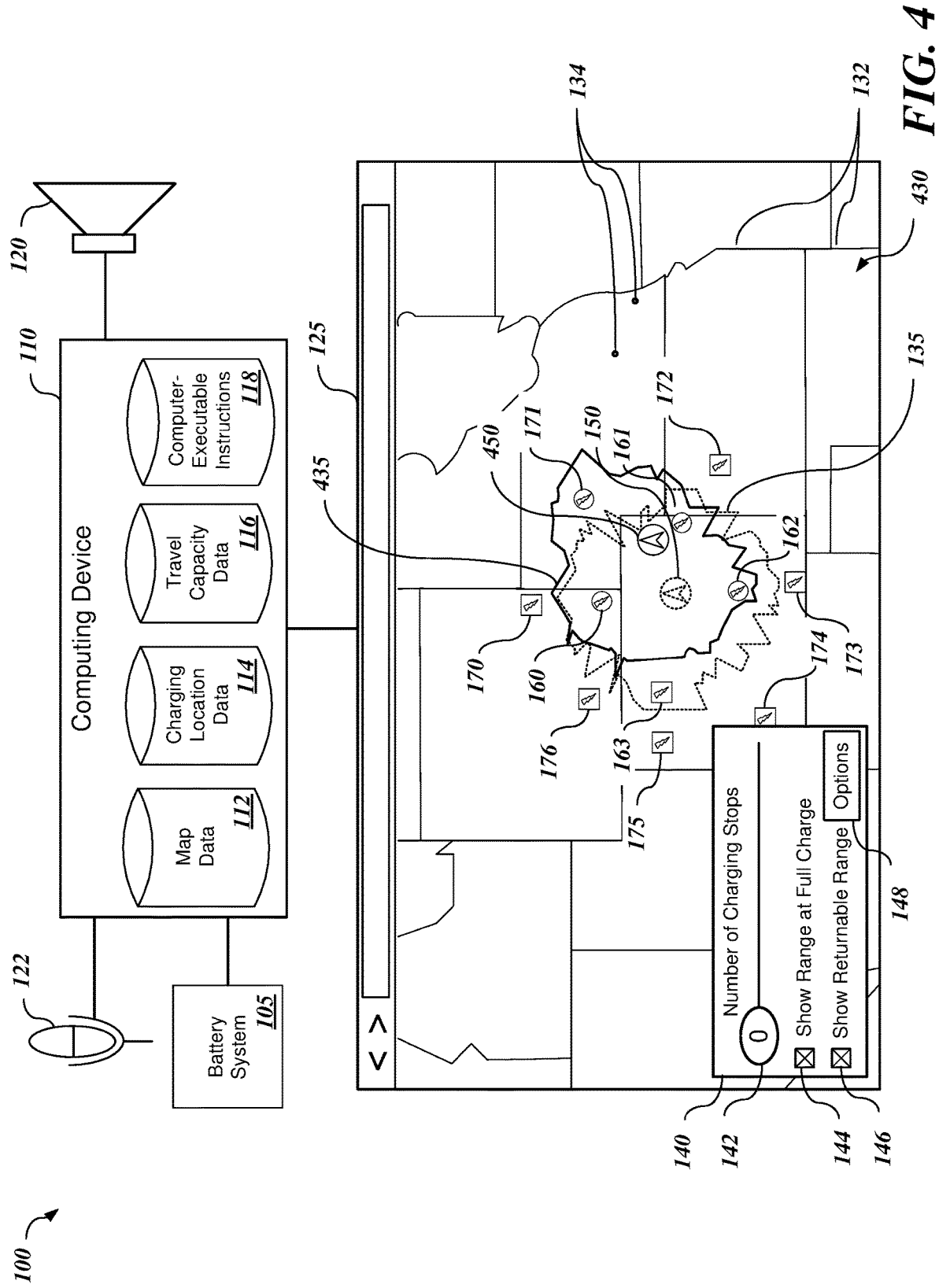

Referring additionally to FIG. 4, in various embodiments it may be desirable to visualize a travel range of a vehicle from a selected starting location 450. For example, a potential buyer or lessee of an electric vehicle may wish to consider a travel range of the vehicle from his or her home, office, and/or other location before acquiring the vehicle. Thus, a user may apply a digit to the display 125 to specify a starting location. Alternatively, the user may enter an address via text entry via the display 125 or by voice command via the audio input interface 122 to specify the selected starting location 450. The computing system 110 then may determine the travel range from the selected staring location 450 and represent the travel range from the selected starting location 450 with a perimeter 435 displayed on the map 430. It will be appreciated that the perimeter 435 that represents the travel range from the selected starting location 150 is different from the perimeter 125 (shown in dotted lines in FIG. 4) that represents the travel range from the previous starting location 150.

The change in the starting location to the selected starting location 450 may place some charging locations out of travel range represented by the perimeter 435, such as the charging location 163. At the same time, departing from the selected starting location 450 may bring other charging locations within the travel range represented by the perimeter 435, such as the charging location 171. Thus, the visual representations of the charging location 163 is changed to a dotted-line representation or otherwise changed to show that the charging location 163 is no longer within the travel range of the vehicle without recharging the battery system 105. On the other hand, the visual representation of the charging location 171 is changed to a solid-line representation or is otherwise changed to show that the charging location 171 is within the travel range of the vehicle.

Figure 5:
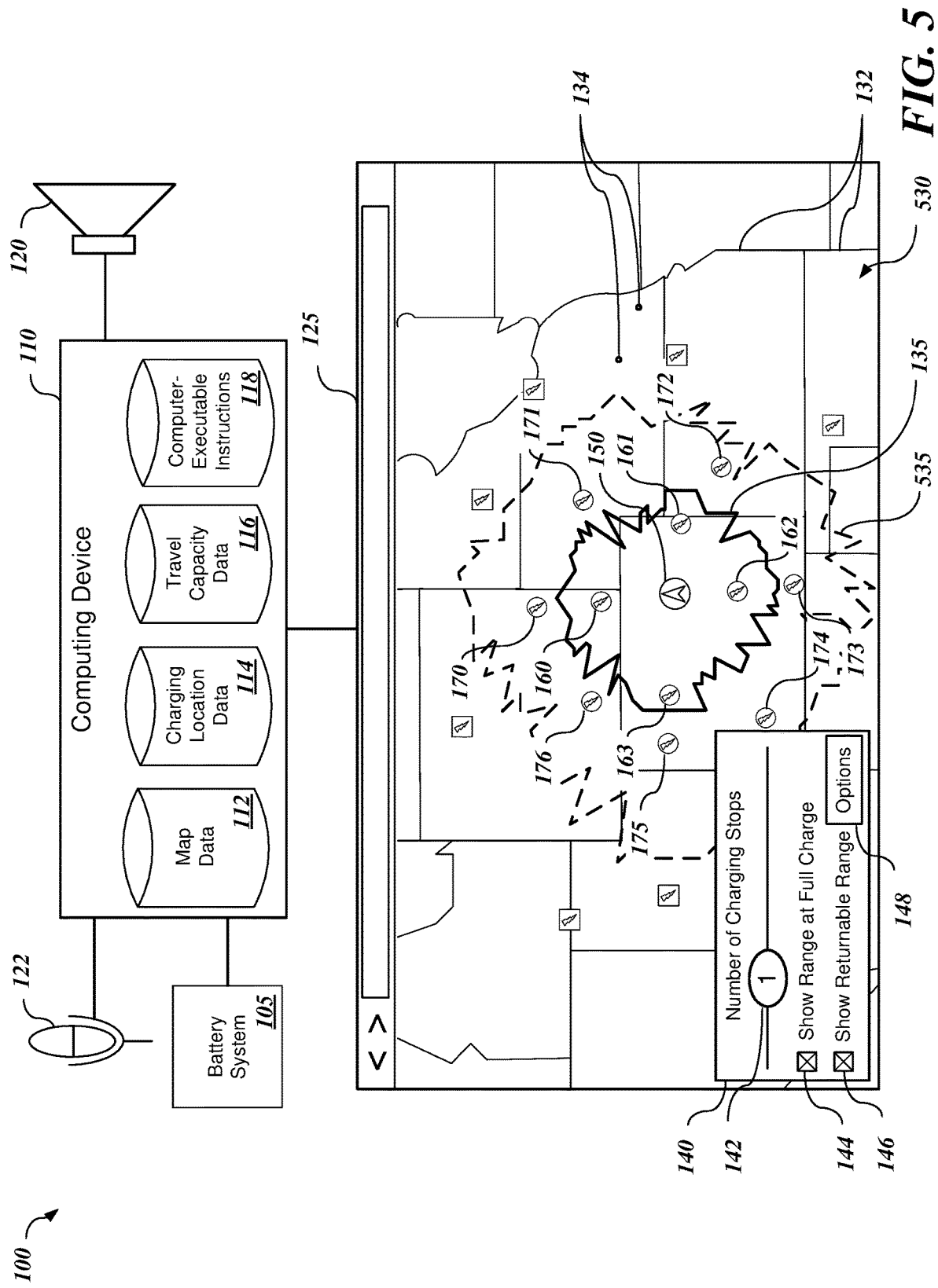

Referring additionally to FIG. 5, a user also can select to determine an extend travel range based on increasing the travel range of the vehicle by charging the vehicle at one or more charging locations. In various embodiments, the user can thus select to visualize a travel range based on a specified number of recharging stops and display the extended travel range on the display 125. As previously described, the charging selector 142 of the charging control interface 140 or tactile and/or verbal input enables a user to specify a number of charging stops to be included in determining the travel range of the vehicle. For example, the charging selector 142 may be manipulated by sliding a digit (not shown) across the charging selector 142 on the display 125 to determine the travel range based on one charging stop. As previously described with reference to FIG. 2, the computing device 110 determines the travel range of the vehicle along possible routes from the starting point. By adding a recharging stop at a charging location along each possible route, the travel range was increased, thereby resulting in a travel range represented by an extended perimeter 535 (represented as a dashed line in FIG. 5) on the map 530.

Figure 6:
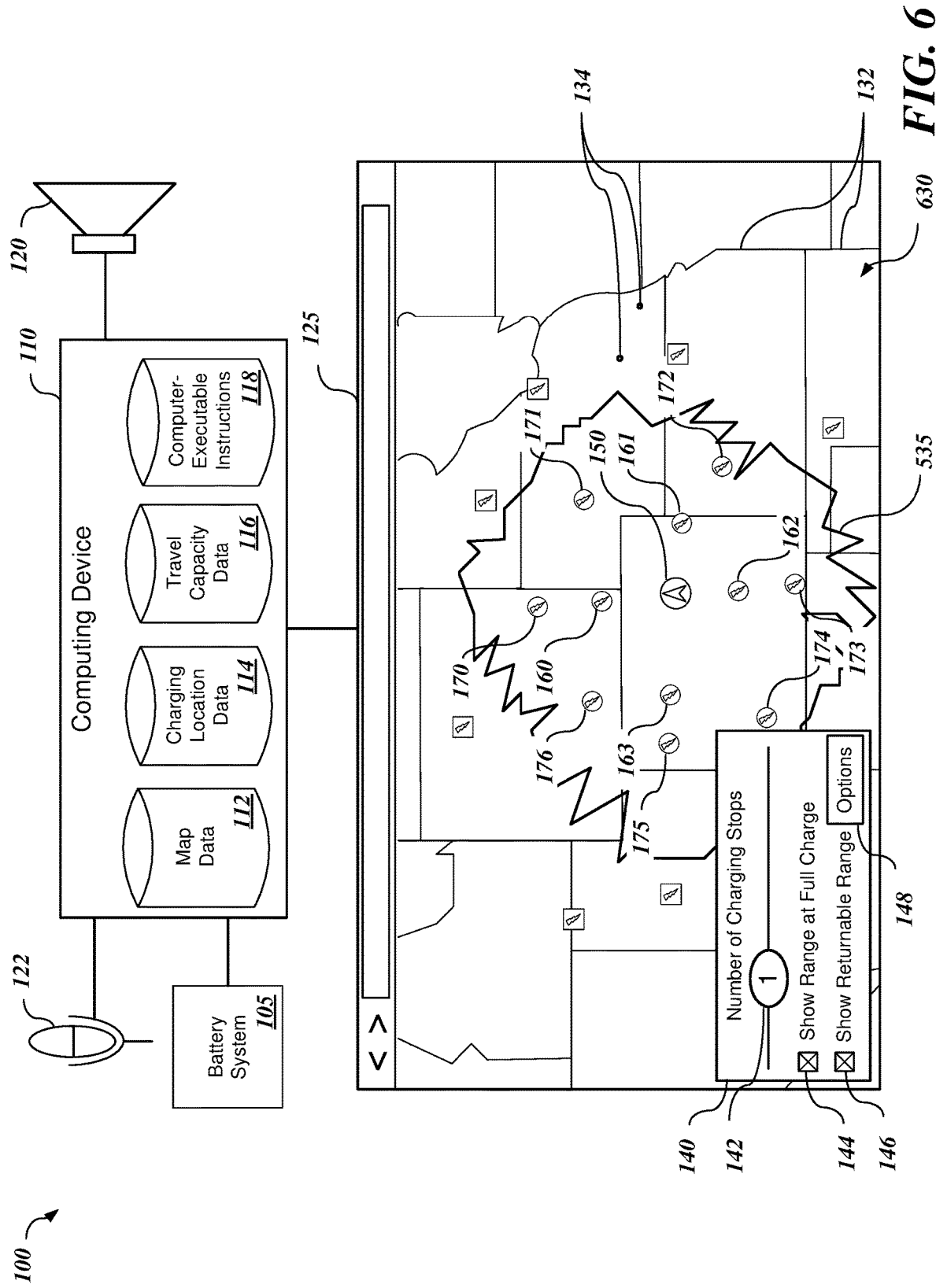

In various embodiments, the perimeter 135 and the extended perimeter 535 both are shown to demonstrate the difference in the travel range afforded with no charging stops and with one charging stop, respectively. However, if the user only wishes to visualize the total travel range available with one charging stop, referring additionally to FIG. 6, the map 630 may represent only the extended perimeter 535 without showing the perimeter 135 (FIGS. 1 and 3-5).

Figure 7:
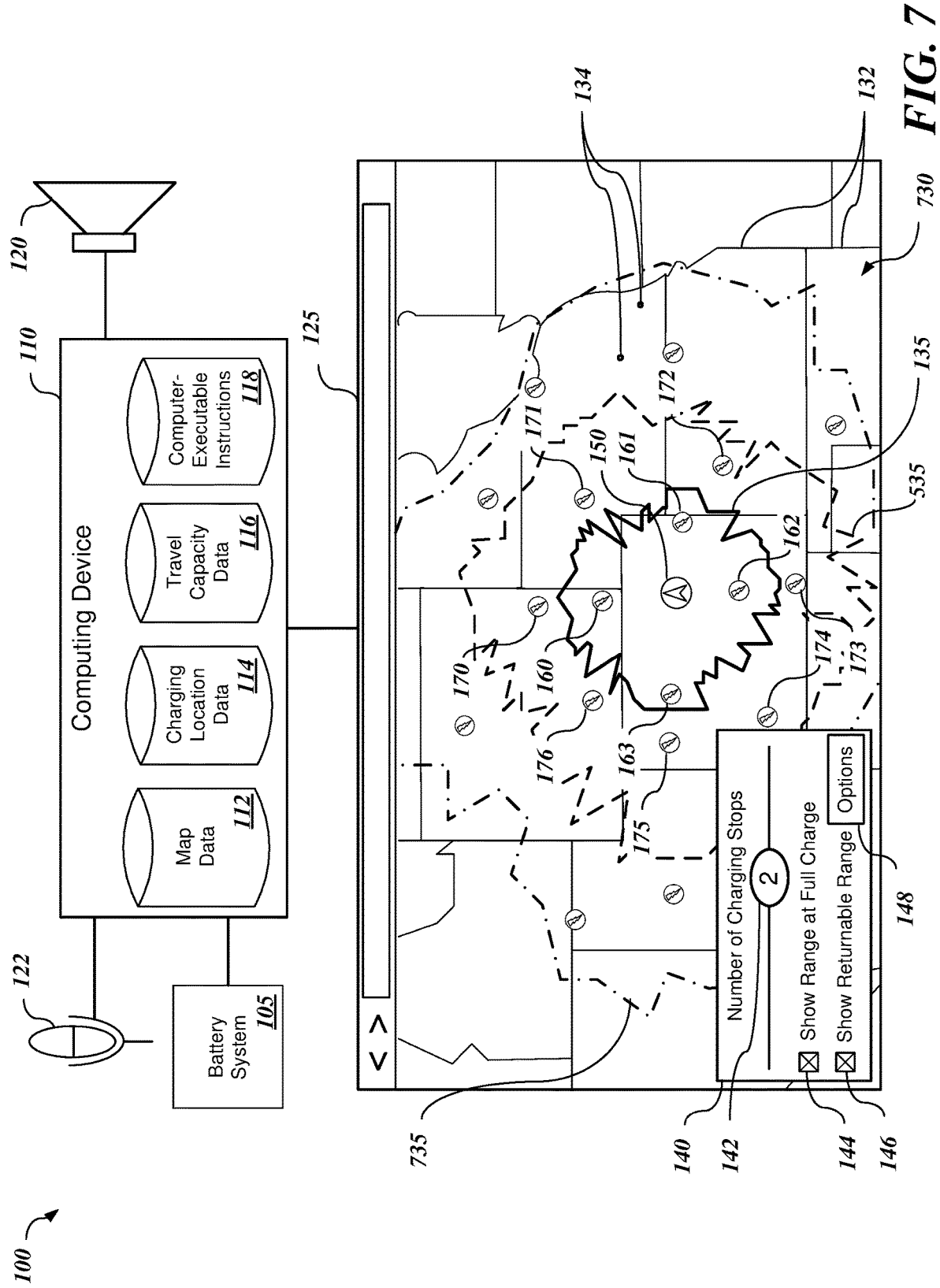

Referring additionally to FIG. 7, the user may select to visualize the travel range that may be available with more than one included charging stop. For example, by manipulating the charging selector 142 of the charging location interface 140 to include two charging stops, the map 730 includes a further expanded perimeter 735 (represented by a dotted and dashed line). The further expanded perimeter 735 represents a locus of the endpoints of the travel range along each of the available routes from the starting location 150 with two charging stops along each route. In various embodiments, the map 730 may include the perimeters 135, 535, and 735 to show the comparison of the travel ranges available with no charging stops, one stop, and two charging stops, respectively. In various embodiments, as previously described with reference to FIG. 6, only the largest perimeter (the further extended perimeter 735) may be shown to visualize the largest possible travel range available by including two charging stops.

Figure 8:
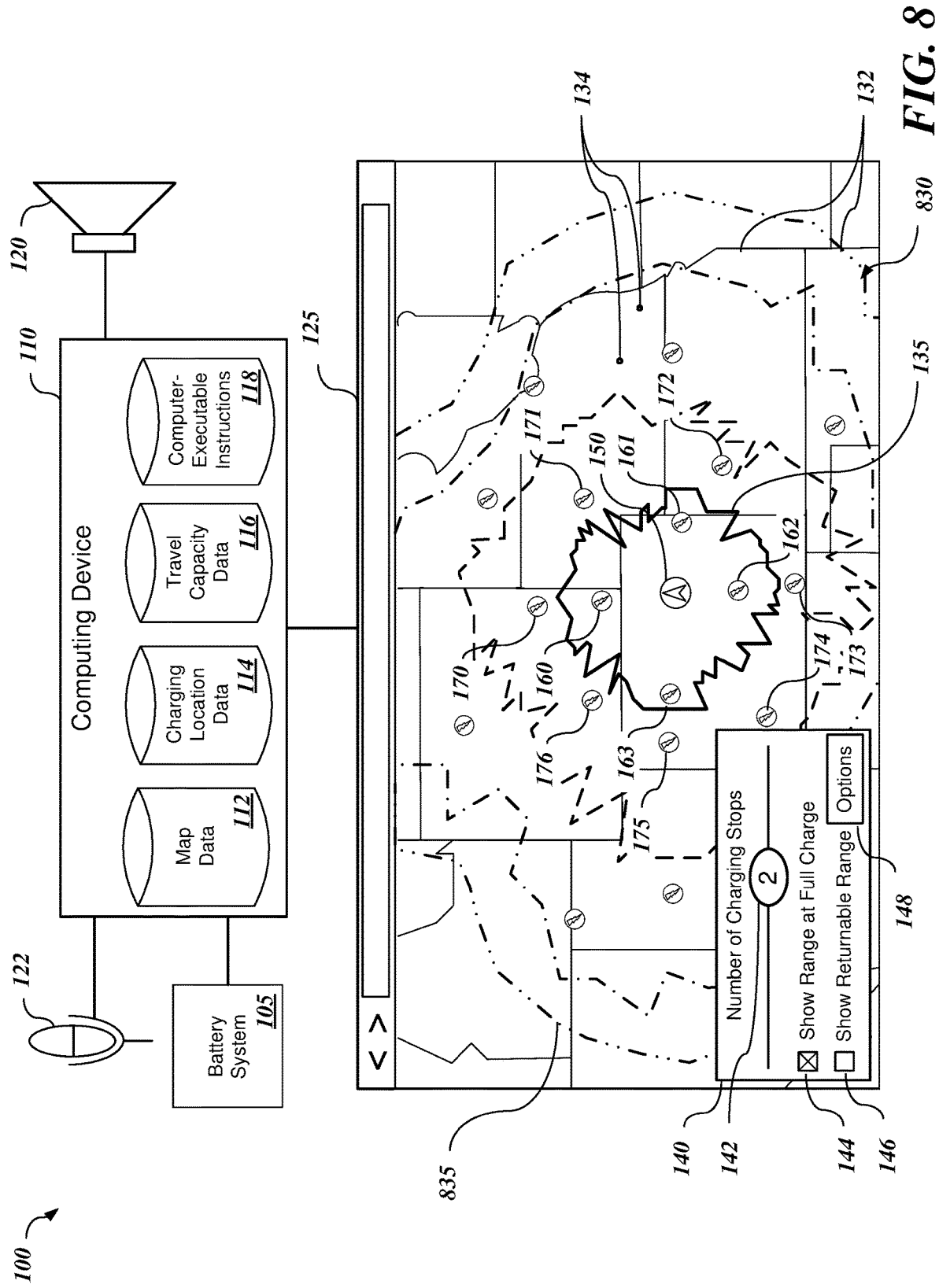

Referring additionally to FIG. 8, as previously described with reference to FIG. 1, a user may choose to visualize the travel range that is limited to preserve enough charge in the battery system 105 to enable the vehicle to return to a charging location so that the vehicle is not stranded. In various embodiments, a user also may choose to visualize the travel range possible upon expending all of the charge in the battery system. In various embodiments, from the charging location interface 140, the user may de-select the returnable range option 146. As a result, the map 830 may present an extreme perimeter 835 (represented with a double-dotted and dashed line in FIG. 8) that represents a travel range that does not provide for keeping a reserve in the battery system 105 to return to a charging location. Unless the user carries extra power cells or knows of a private charging location where the battery system 105 may be charged, traveling to an end of the travel range represented by the extreme perimeter 835 may possibly present a risk. Nonetheless, in various embodiments, the system 100 may allow the user to visualize the full extent of the travel range based on a specified number of stops to recharge.

Figure 9:
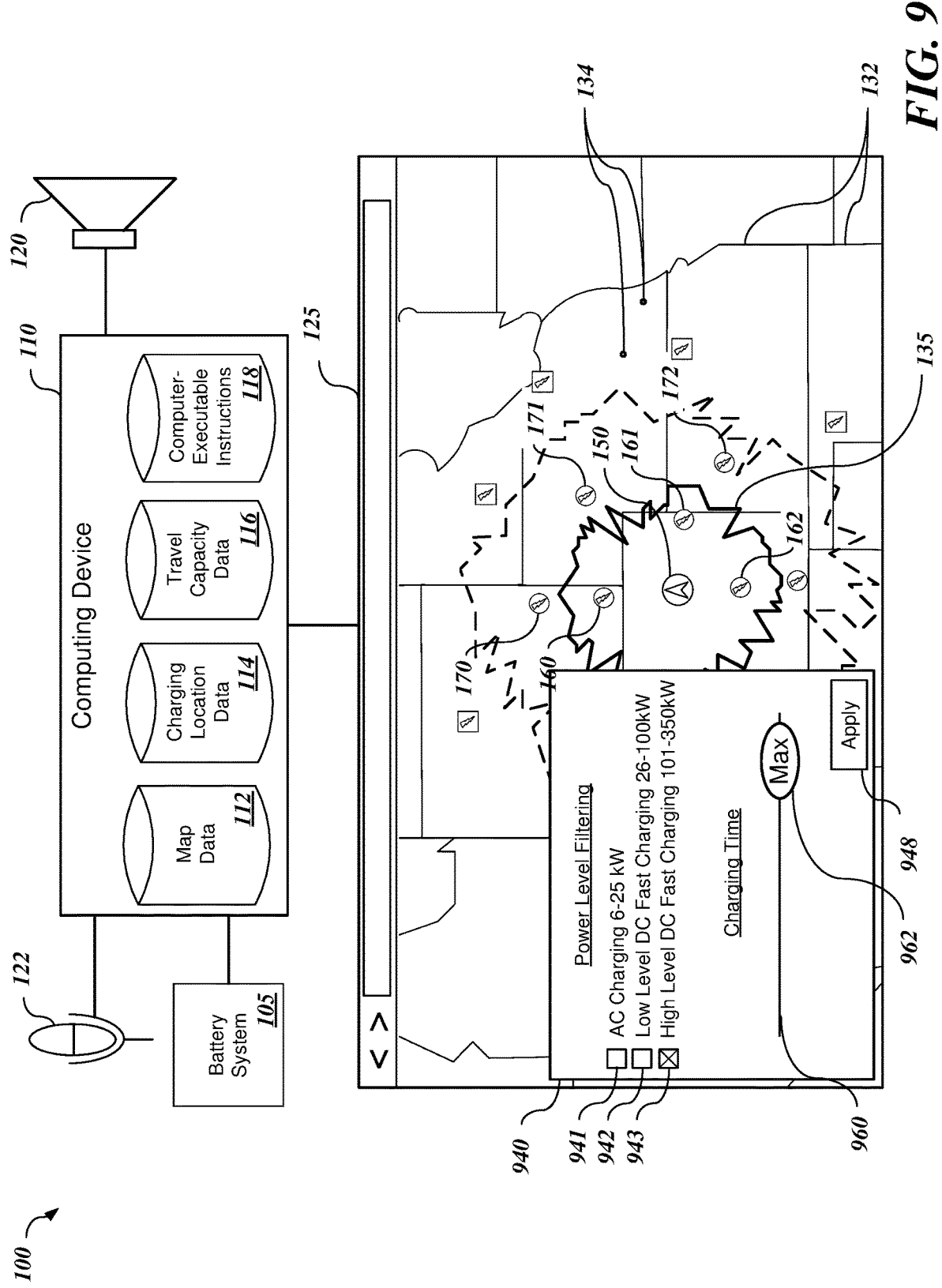

As described with reference to FIG. 9, in various embodiments the system 100 enables a user to filter the charging locations to be displayed by type and/or to specify a charging time to spend at the one or more charging locations. As previously described with reference to FIG. 1, the charging location interface 140 may include an options selection 148 to enable the user to further specify charging options. In various embodiments, selecting the options selection 148 provides access to an options interface 940 from which a user can select the types of charging location to include. In various embodiments, filters 941-943 permit selective inclusion of charging locations with, for example, relatively low-speed AC charging (at 6 to 25 KW) 941, low level fast DC charging (at 26-100 kW) 942, and high level fast DC charging (at 101-350 kW) 942. Thus, a user may choose to visualize a travel range allowing for stops only at high-speed charging locations or to include other charging options as well.

The options interface 940 also may include a charging time selection 960 to enable the user to specify how long to allow for charging at each of the charging locations. In the example of FIG. 9, as a default or user selection, the charging time selection 960 is set to maximum to recharge the battery system 105 to a maximum charge level. As further described below, a user also may choose to limit the available charging time. An apply selection 948 regenerates the map to apply the options selected from the options interface 940. In the example of FIG. 9, the user selects to filter the charging locations to only high level fast DC charging (at 101-350 kW) 943.

Figure 10:
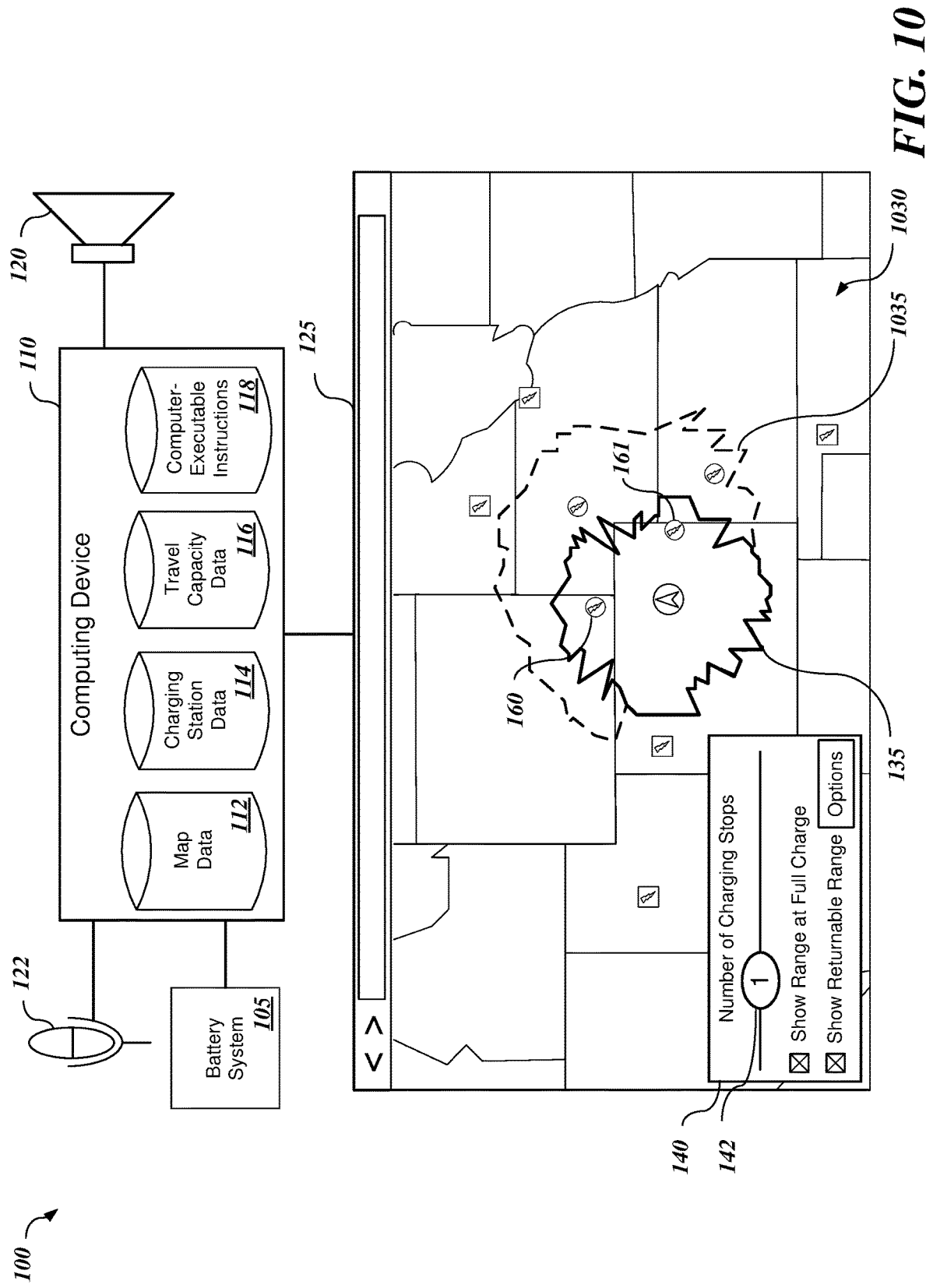

Referring additionally to FIG. 10, by filtering out all but charging locations that provide high level fast DC charging and by specifying inclusion of up to one charging stop with the charging selector 142, most of the charging locations included on previously-generated maps 130, 330, 430, 530, 630, 730, and 830 are excluded. On the map 1030, only charging locations 160 and 161 are included within the perimeter 135 representing the travel range based on the available power from the battery system 105. Consequently, the map 1030 includes an extended perimeter 1035 that only extends the travel range in a direction of the charging locations 160 and 161 because only the routes in the direction of the charging locations 160 and 161 will provide for a greater range of travel with the currently selected charging location parameters.

Figure 11:
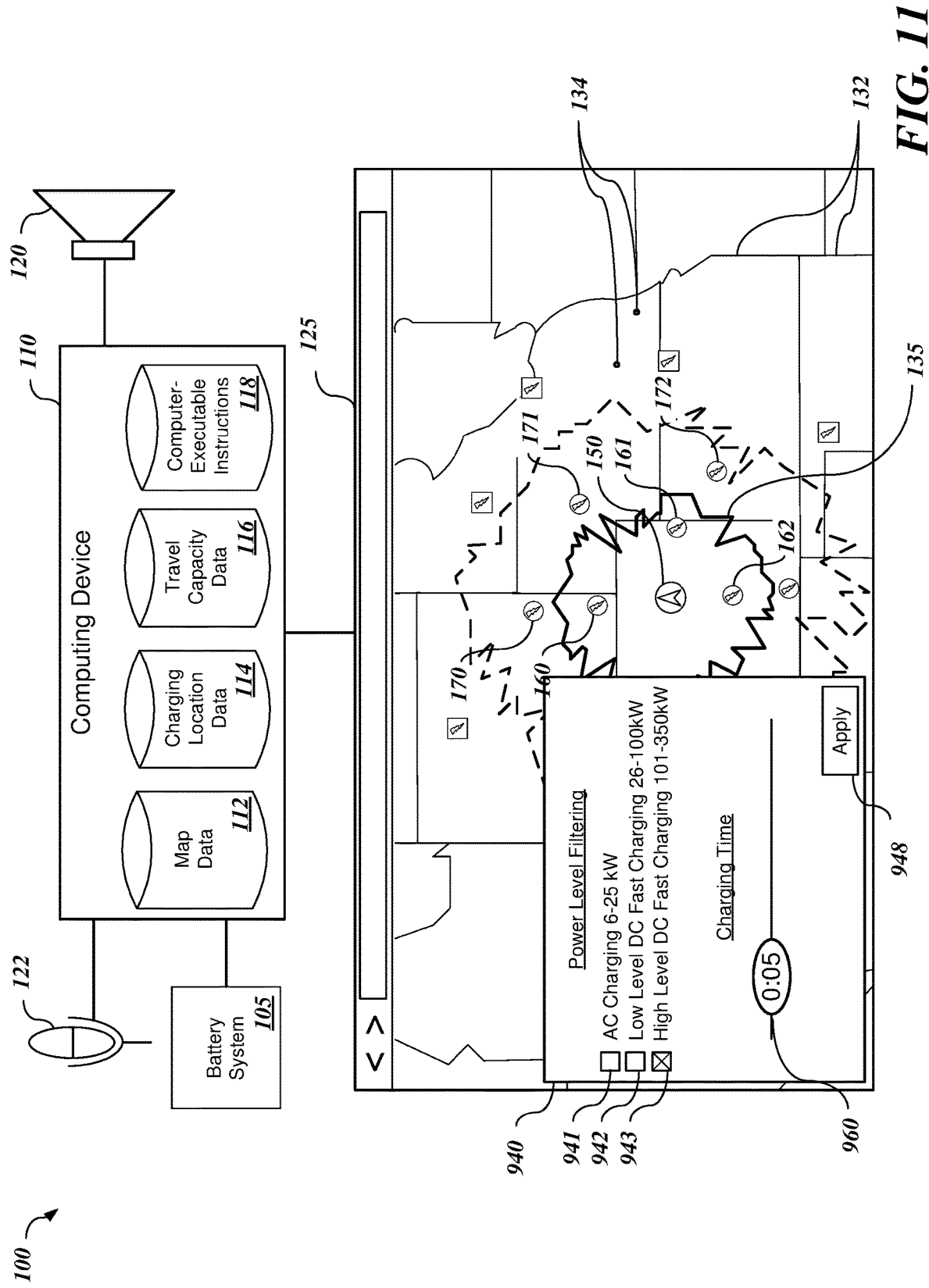

Referring additionally to FIG. 11, from the options interface 940, the charging time selection 960 is set to a charging time of five minutes (0:05). Although five minutes of charging at a high level fast DC charging location (as selected with reference to FIG. 9) extends the range of travel, the range of travel is not extended as far as a full charge.

Figure 12:
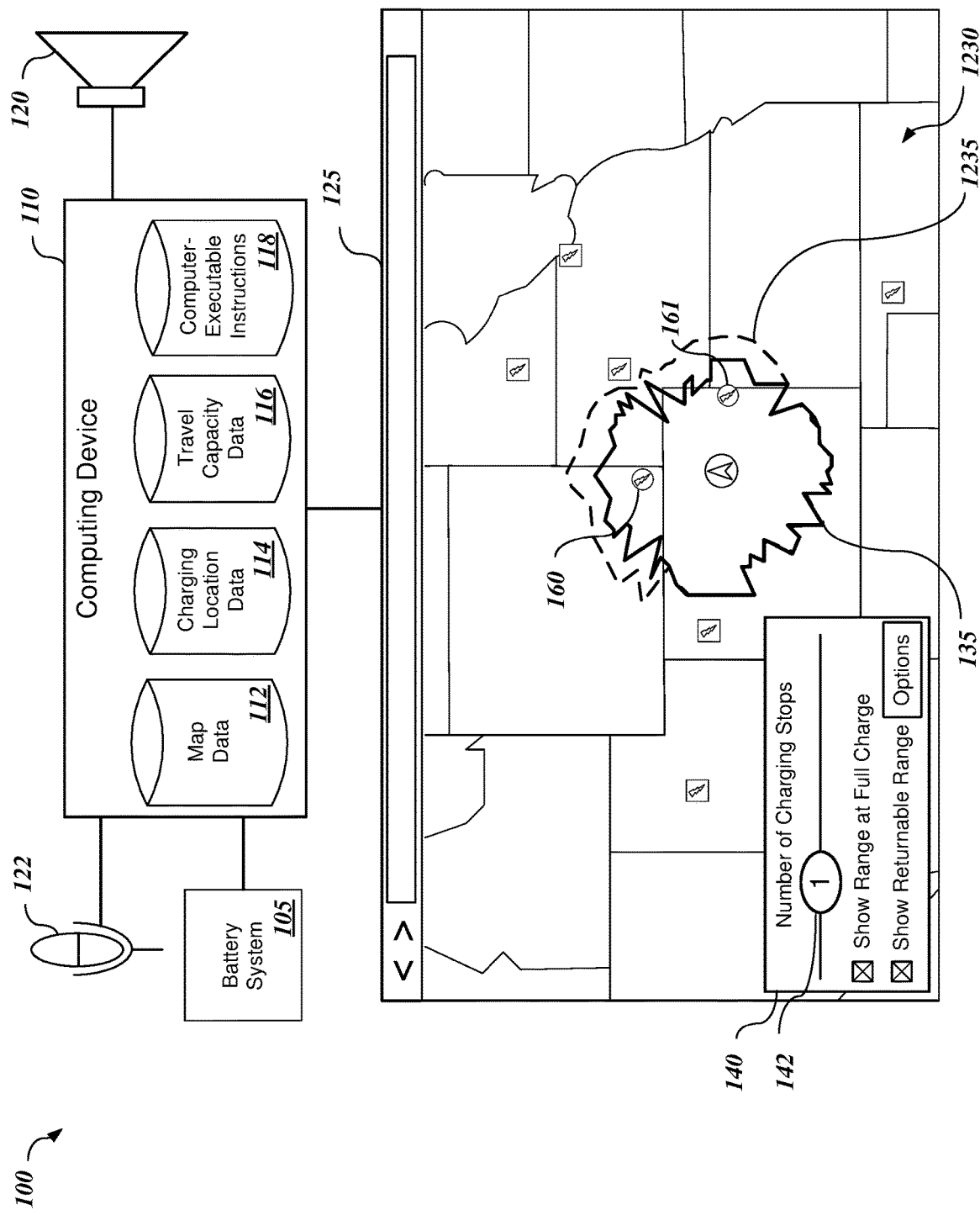

Referring additionally to FIG. 12, the map 1230 shows an extended perimeter 1235 resulting from application of the user selection to restrict the charging time to five minutes (0:05) described with reference to FIG. 11. The extended perimeter 1235, like the extended perimeter 1035 of FIG. 10, is only extended in a direction in which the filtered charging locations 160 and 161 are located. Further, because only five minutes of charging was specified, the travel range represented by the perimeter 1235 is not as large as the extended perimeter 1035 with full charging. As desired, a user may iteratively change the charging time and/or allow for other types of charging locations to be included to evaluate different travel ranges that are possible based on the type of charging locations selected and the specified charging duration.

In various embodiments. the system 100 of FIGS. 1 and 3-12 may be integrated into or carried aboard any suitable vehicle or supported by a standalone computing device. A vehicle may include a car, truck, sport utility vehicle, van, or recreational vehicle. In various embodiments, the vehicle also may include a motorcycle, all-terrain vehicle, or an electrically-powered moped or bicycle. In various embodiments, the vehicle also may include a marine vessel (such as a boat or a ship). In various embodiments, the vehicle also may include an aircraft (such as fixed-wing aircraft, rotary wing aircraft, and lighter-than-air craft).

Figure 13:
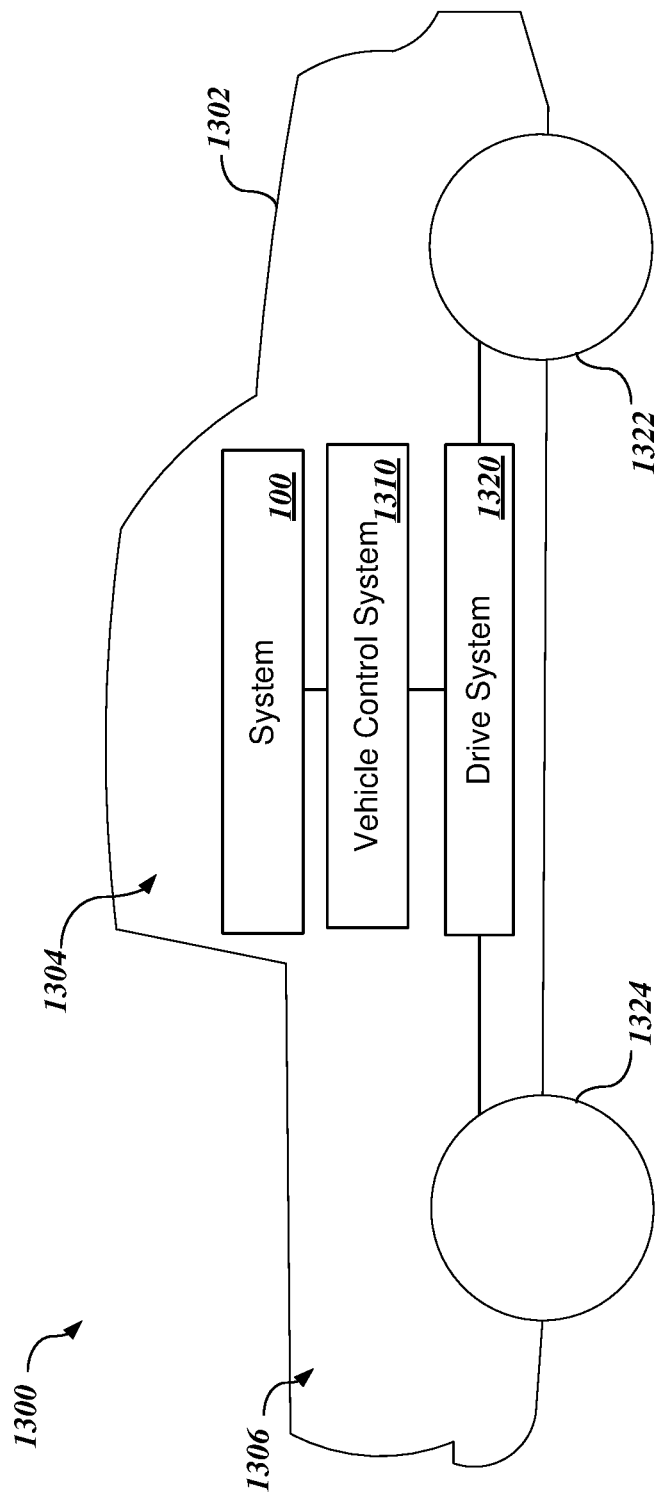
FIG. 13 is a block diagram in partial schematic form of an illustrative vehicle that includes the system of FIGS. 1 and 3-12.

Referring additionally to FIG. 13, in various embodiments a vehicle 1300 includes an integrated vehicle control system 1310 that controls operation of the vehicle 1300. In various embodiments, the vehicle control system 1310 may incorporate or interoperate with the system 100. In various embodiments, the system 100 may be a standalone system that is transportable aboard the vehicle 1300 or transportable without a vehicle, such as a smartphone, tablet computer, or other portable computing device.

In various embodiments, the vehicle 1300 includes a body 1302 that may include a cabin 1304 capable of accommodating an operator, one or more passengers, and/or cargo and a cargo area 1306 separate from the cabin 1304, such as a trunk or a truck bed, capable of transporting cargo. When the cabin 1304 accommodates one or more occupants, the system 100 may be installed in and/or accessible from the cabin 1304, as further described below with reference to FIG. 16. The vehicle 1300 includes a drive system 1320, as further described below, which is selectively engageable with one or more front wheels 1322 and/or one or more rear wheels 1324 to motivate, accelerate, decelerate, stop, and steer the vehicle 1300.

Referring additionally to FIG. 14, the system 100 may be used with an electrically-powered vehicle 1400. The wheels 1412 and/or 1414 may be motivated by one or more electrically-powered drive systems 1420 and/or 1430, such as motors, operably coupled with the wheels 1412 and/or 1414. The drive systems 1420 and 1430 draw power from a battery system 1410, which also may be used to power the system 100.

Referring additionally to FIG. 15, the system 100 may be used with an internal combustion engine-powered vehicle 1500. Although the foregoing examples were directed to charging locations and charging duration, it will be appreciated that the system could be applied to gas stations with the user specifying how much gasoline to buy at each refueling stop, etc. The wheels 1512 and/or 1514 may be motivated by an internal combustion or hybrid engine 1520 coupled with a fuel tank 1510 via a fuel line 1512. The engine 1520 may be coupled to the wheels 1512 and/or 1514 by mechanical linkages 1530 and 1540, respectively, including axles, transaxles, or other drive train systems to provide rotational force to power the wheels 1512 and/or 1514. It will be appreciated that FIGS. 13-15 show four-wheeled land vehicles. However, as previously mentioned, it will be appreciated that the system 100 may be integrated with other land vehicles, aircraft, or marine craft.

Figure 16:
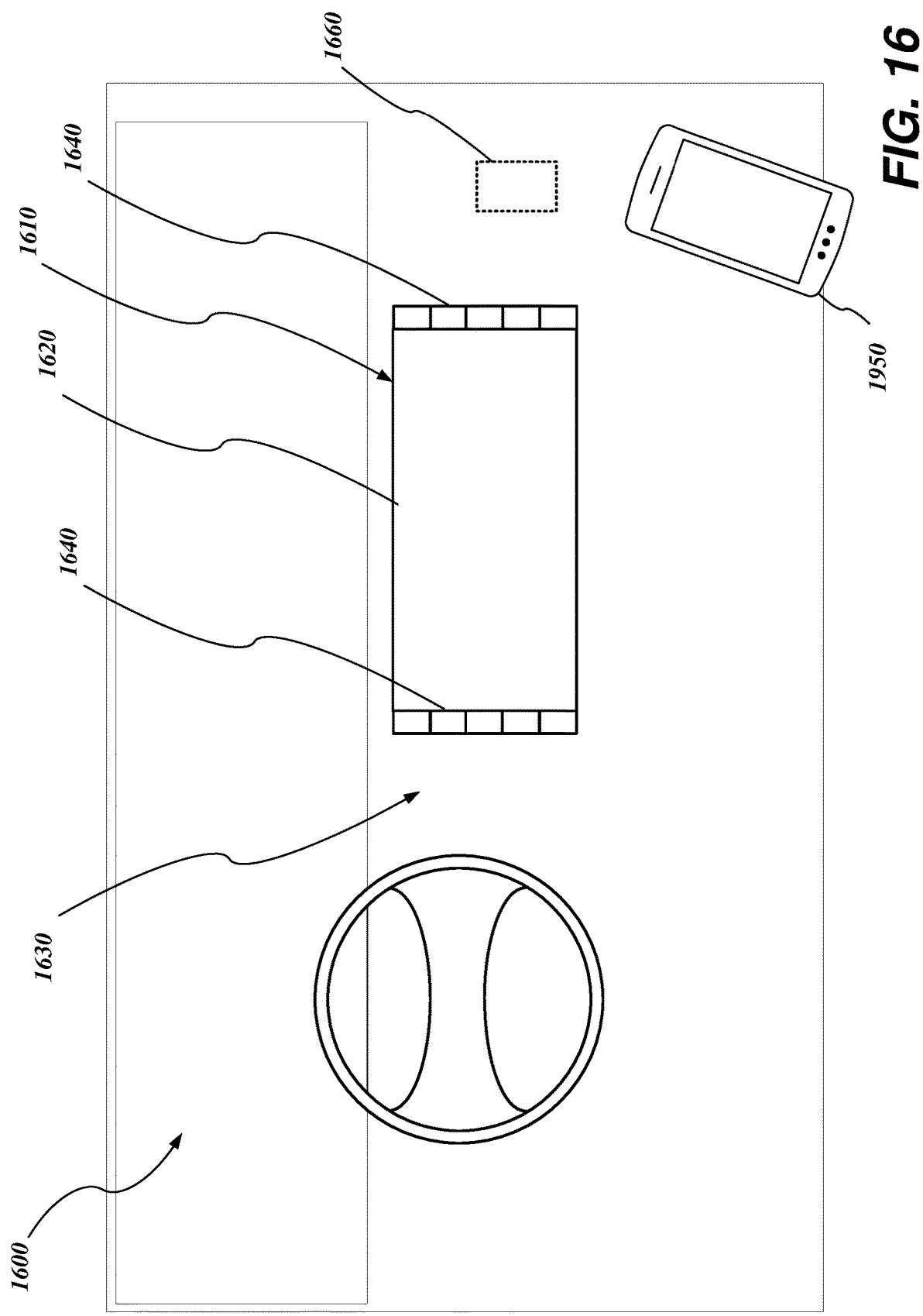
FIG. 16 is a perspective view of a cabin of a vehicle with access to the system of FIGS. 1 and 3-12.

Referring additionally to FIG. 16, in various embodiments a cabin 1600 (if provided) of a vehicle, such as cabin 1304 of the vehicle 1300 (FIG. 13) may include an integrated navigation system 1610 that incorporates the system 100 for visualizing travel range. As previously described, the system 100 may be integrated with or interoperable with the vehicle control system 1310 (FIG. 13). The integrated navigation system may use a display 1620 incorporated in a dashboard or console 1630 within the cabin 1600. The display 1610 may include an interactive display, as previously described with reference to FIG. 1 or a user may engage the system 100 with other input devices 1640 arrayed on the dashboard 1830 or with verbal commands using the audio input interface 122 (FIG. 1). The system 100 also may be supported on a standalone computing device 1650, such as a smartphone, tablet computer, portable computer, smartwatch, or dedicated device. The system 100 may interface with the vehicle control system 1610 via a wired or wireless interface 1660 to enable the standalone computing device 1650 to exchange data with the vehicle control system 1310. However, as also previously stated, embodiments of the system 100 may operate on computing systems that are entirely independent of and/or used at locations away from the vehicle.

Figure 17:
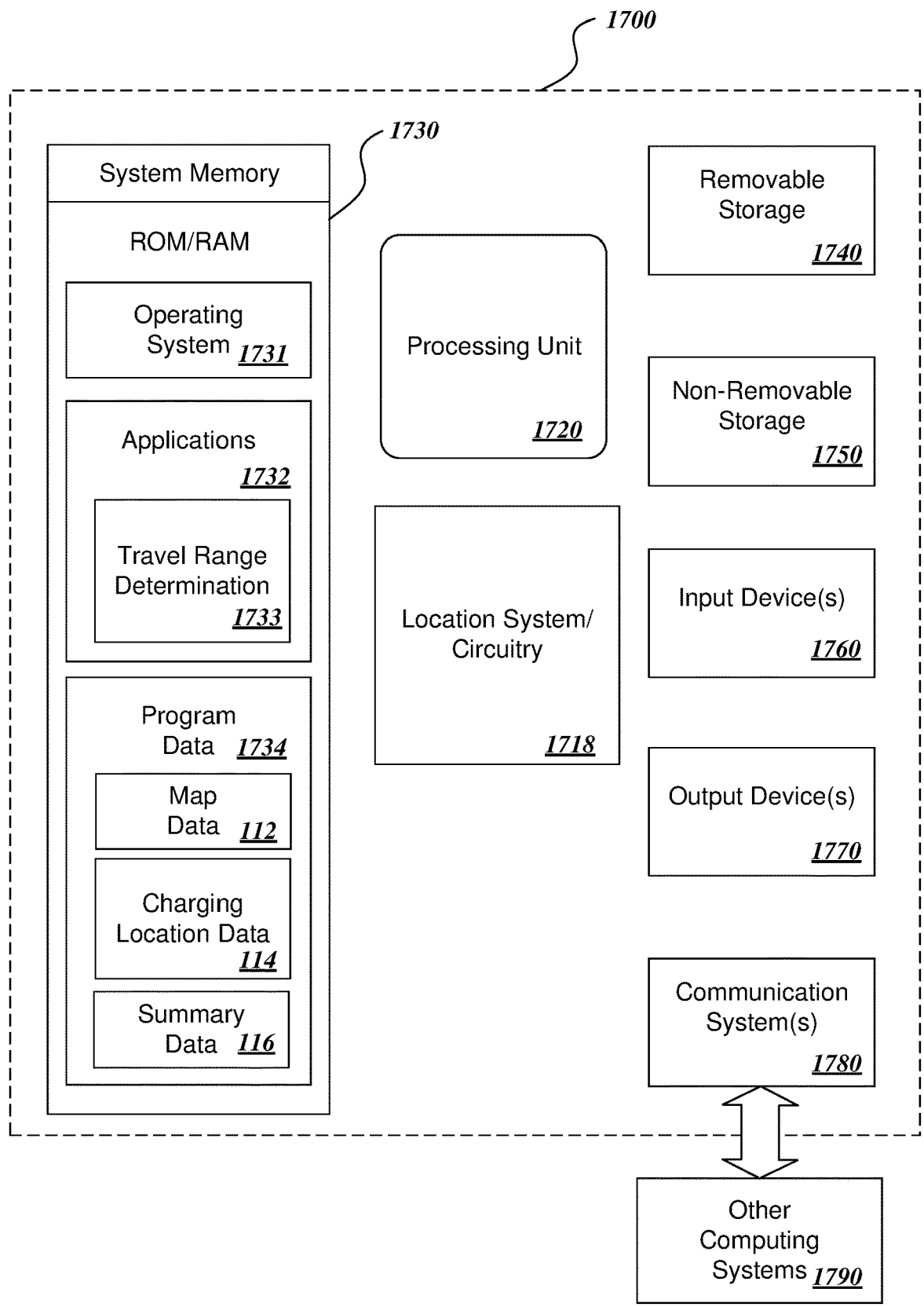
FIG. 17 is a block diagram of an illustrative computing system for performing functions of the system of FIGS. 1 and 3-12.

Referring additionally to FIG. 17 and given by way of example only and not of limitation, the computing device 110 of the system 100 (FIG. 1) may include a general purpose computing device 1700 configured to operate according to computer-executable instructions for determining and visualizing travel range as previously described. The computing device 1700 typically includes at least one processing unit 1720 and a system memory 1730. Depending on the configuration and type of computing device, the system memory 1730 may include volatile memory, such as random-access memory ("RAM"), non-volatile memory, such as read-only memory ("ROM"), flash memory, and the like, or a combination of volatile memory and non-volatile memory. The system memory 1730 typically maintains an operating system 1731, one or more applications 1732, and program data 1734. The operating system 1731 may include any number of operating systems executable on desktop or portable devices including, but not limited to, Linux, Microsoft Windows®, Apple iOS®, or Android®, or a proprietary operating system. The applications 1732 may include an embodiment of the travel range determination application 1733 as herein described. The program data 1734 may include the map data 112, charging location data 114, and travel capacity data 116, as previously described.

The computing device 1700 may also have additional features or functionality. For example, the computing device 1700 may also include additional data storage devices (removable and/or non-removable) such as, for example, magnetic disks, optical disks, tape, or flash memory. Such additional storage devices are illustrated in FIG. 17 by removable storage 1740 and non-removable storage 1750. Computer storage media may include volatile and non-volatile, removable and non-removable media implemented in any method or technology for storage of information, such as computer-readable instructions, data structures, program modules or other data. The system memory 1730, the removable storage 1740, and the non-removable storage 1750 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1700. Any such computer storage media may be part of the computing device 1700.

The computing device 1700 may also have input device(s) 1760 such as a keyboard, stylus, voice input device, touchscreen input device, etc. Output device(s) 1770 such as a display, speakers, short-range transceivers such as a Bluetooth transceiver, etc., may also be included. The computing device 1700 also may include one or more communication systems 1780 that allow the computing device 1700 to communicate with other computing systems 1790, such as those described below with reference to FIG. 18. As previously mentioned, the communication system 1780 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 17, the computing device 1700 may include the location system/circuitry 1718, which may include global positioning system ("GPS") and/or geolocation circuitry that can automatically discern its location based on relative positions to multiple GPS satellites or other signal sources, such as cellphone towers or other signal sources. The location system/circuitry 118 may be used to determine a location of the system 100, as previously described.

Figure 18:
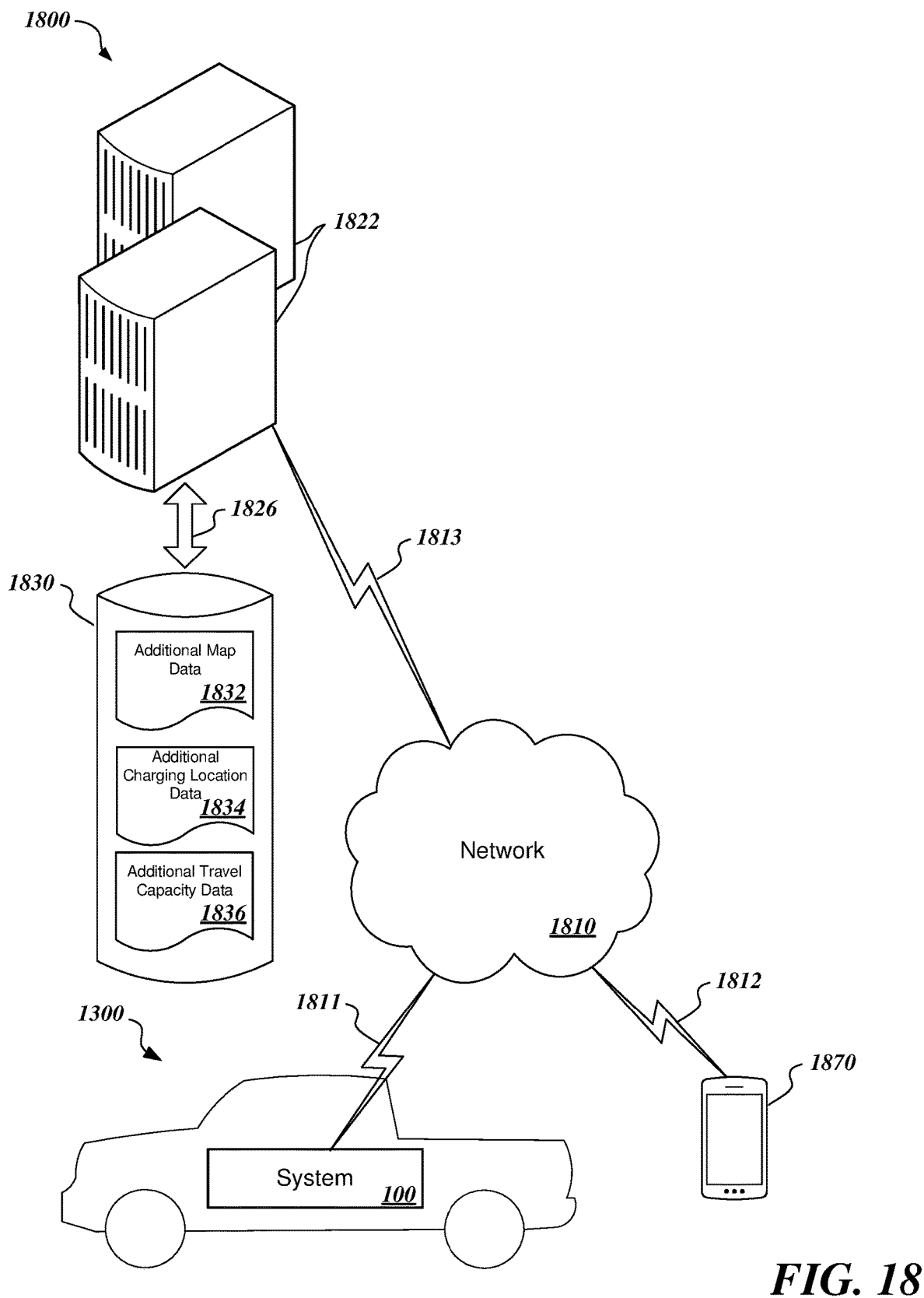
FIG. 18 is a block diagram of one or more illustrative systems of FIGS. 1 and 3-12 communicating with one or more remote systems.

In addition to one or more onboard computing systems, various embodiments may communicate with remote computing systems to perform the functions herein described. Referring to FIG. 18, an operating environment 1800 may include one or more sets of remote computing systems 1820. It will be appreciated that the remote computing system 1820 may include one or more computing systems 1822 that may reside at one or more locations. In various embodiments, the remote computing systems 1820 each may include a server or server farm. The remote computing system 1820 may provide additional sources of travel-related data and charging-related data in data storage 1830, such as additional map data 1832, additional charging location data 1834, and additional travel capacity data 1836. The data may be used to update or supplement data stored on the system 100 aboard the vehicle 1300 or on a standalone computing device 1870. The remote computing system 1820 may access programming and data used to perform their functions or the additional map data 1832, additional charging location data 1834, and additional travel capacity data 1836 over high-speed buses 1826 to interact with data storage 1830.

The additional map data 1832, additional charging location data 1834, and additional travel capacity data 1836 at the remote computing system 1800 may be accessible to populate, restore, update or augment the map data 112, the charging location data 114, and the travel capacity data 116 (FIG. 1), respectively, stored in the system 100 that, in various embodiments, is integrated with or transportable aboard the vehicle 1300.

In various embodiments, the remote computing systems 1820 communicate with a network 1810 over wired and/or wireless communications links 1813. The system 100 may be integrated with or transportable aboard a vehicle, such as the vehicle 1300 (FIG. 13). The system 100 may communicate over the network 1810 via communications links 1811 to access the remote computing system 1820 to retrieve or store data from the data storage 1830. The communications links 1811 may include wireless communications links to enable mobile communications with the system 100 or may include a wired links to be used, for example, when the vehicle 1300 includes an electric vehicle that is stopped and/or plugged in for charging.

The system 100 also may be supported by a computing system 1870 that is not integrated with or transported aboard the vehicle 1300. The computing system 1870 may include a portable computing system, such as a portable computer, tablet computer, smartphone, or smartwatch and may be used to store or access off-road travel data. The computing system 1870 may communicate over the network 1810 via a communications link 1812 to access the remote computing system 1820 to retrieve data from the additional map data 1832, additional charging location data 1834, and additional travel capacity data 1836 in the data storage 1830. The communications link 1812 may include a wireless or a wired communications link.

Figure 19:
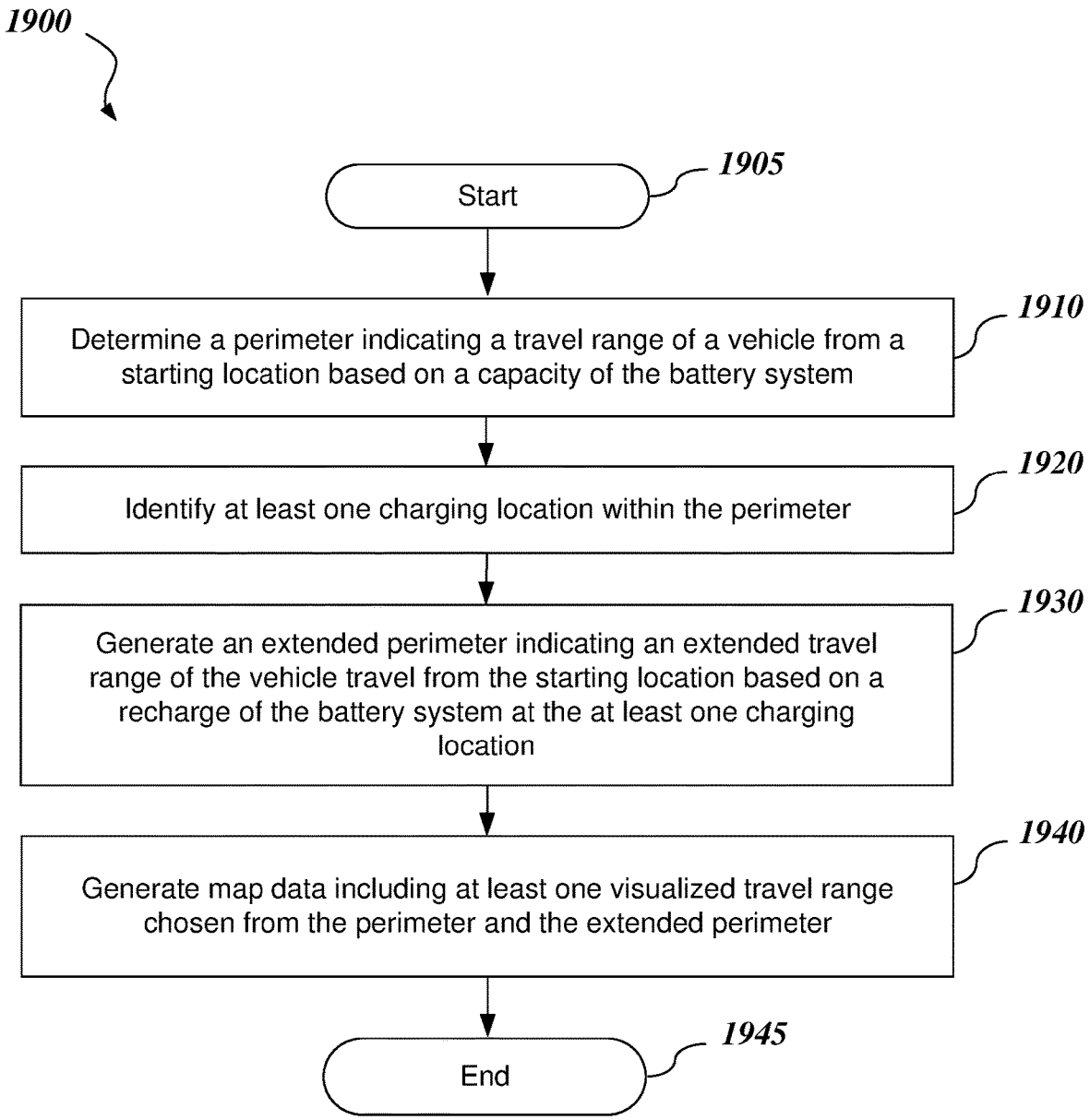
FIG. 19 is a flow chart of an illustrative method for determining and visualizing the travel range of a vehicle.

Referring to FIG. 19, an illustrative method 1900 is provided for determining and visualizing travel ranges. The method 1900 starts at a block 1905. At a block 1910, a perimeter that indicates a travel range of a vehicle is determined from a starting location based on a capacity of the battery system. At a block 1920, at least one charging location within the perimeter is identified. At a block 1930, an extended perimeter is generated indicating an extended travel range of the vehicle travel from the starting location based on a recharge of the battery system at the at least one charging location. At a block 1940, map data is generated that includes at least one visualized travel range chosen from the perimeter and the extended perimeter. The method 1900 ends at a block 1945.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A computer-implemented method comprising:
   determining a perimeter indicating a travel range of a vehicle from a starting location based on a capacity of a battery system of the vehicle, wherein the perimeter is one of a full range perimeter and a returnable range perimeter responsive to a user perimeter type selection elicited and received via a display in the vehicle;
   displaying the perimeter on the display in the vehicle;
   identifying at least one charging location within the perimeter responsive to a user charging stop number selection elicited and received via the display in the vehicle;
   determining an extended perimeter indicating an extended travel range of the vehicle from the starting location based on a recharge of the battery system at the at least one charging location based on a selected charging time elicited and received via the display in the vehicle, wherein the extended perimeter is one of a full range extended perimeter and a returnable range extended perimeter responsive to the user perimeter type selection elicited and received via the display in the vehicle;
   displaying the extended perimeter on the display in the vehicle; and
   generating and displaying map data indicating one or more of the travel range and the extended travel range on the display in the vehicle.

2. The computer-implemented method of claim 1, wherein:
   determining edges of the perimeter by determining end points of the travel range along a plurality of routes from the starting location; and
   determining extended edges of the extended perimeter by determining extended end points of the extended travel range along the plurality of routes from the starting location.

3. The computer-implemented method of claim 2, wherein the capacity includes a selected capacity chosen from a potential capacity of the battery system at full charge level and a current capacity of the battery system at a current charge level.

4. The computer-implemented method of claim 2, further comprising:
   eliciting a first user input identifying one or more recharging stops to be considered in determining a total range of travel of the vehicle; and
   modifying a map to show the total range of travel of the vehicle upon charging the vehicle at the one or more recharging stops.

5. The computer-implemented method of claim 1, further comprising adding a charge to the battery system based on the selected charging time and a charging speed of an available charging system at the at least one charging location within the travel range.

6. The computer-implemented method of claim 1, further comprising applying a charging location filter limiting identification of the at least one charging location to at least one charging location capable of at a specified charging speed.

7. The computer-implemented method of claim 1, wherein the at least on charging location comprises a plurality of charging locations, wherein the method further comprises:
   restricting the extended perimeter to include a subset of the plurality of charging locations from which the battery system is rechargeable to make a return trip to another charging location from the plurality of charging locations.

8. The computer-implemented method of claim 1, further comprising providing an option to generate the perimeter before generating the extended perimeter.

9. The computer-implemented method of claim 1, wherein a visualized travel range is chosen from a separate perimeter view separately representing both the perimeter and the extended perimeter and a composite perimeter view showing only the extended perimeter.

10. The computer-implemented method of claim 1, further comprising selectively displaying a location of the at least one charging location on the map.

11. A system comprising:
    a display; and
    a computing device including:
        a processor; and
        computer-readable media configured to store computer-executable instructions configured to cause the processor to:
            determine a perimeter indicating a travel range of a vehicle from a starting location based on a battery capacity of the vehicle, wherein the perimeter is one of a full range perimeter and a returnable range perimeter responsive to a user perimeter type selection elicited and received via the display;

display the perimeter on the display;

identify at least one charging location within the perimeter responsive to a user charging stop number selection elicited and received via the display;

determine an extended perimeter indicating an extended travel range of the vehicle from the starting location based on a battery recharge at the at least one charging location based on a selected charging time elicited and received via the display, wherein the perimeter is one of a full range extended perimeter and a returnable range extended perimeter responsive to the user perimeter type selection elicited and received via the display;

display the extended perimeter on the display; and generate and display a map indicating one or more of the travel range and the extended travel range on the display.

12. The system of claim 11, wherein the computer-executable instructions are further configured to cause the processor to:

elicit a first user input identifying one or more recharging stops to be considered in determining a total range of travel of the vehicle; and modify the map to show a total travel range of the vehicle upon charging the vehicle at the one or more recharging stops.

13. The system of claim 12, wherein the computer-executable instructions are further configured to cause the processor to limit identification of the at least one charging location to at least one charging location capable of a specified charging speed.

14. The system of claim 12, wherein the computer-executable instructions are further configured to cause the processor to restrict the perimeter and the extended perimeter to a range of a destination charging location from which a battery system of the vehicle is rechargeable to make a return trip to another charging location within the range of travel.

15. The system of claim 12, wherein the computer system is associated with the vehicle and includes circuitry configured to monitor a vehicle position.

16. A vehicle comprising:

a cabin;

a drive system;

a display; and a computing device having computer-readable media storing computer-executable instructions configured to cause the computing device to:

determine a perimeter indicating a travel range of a vehicle from a starting location based on a battery capacity of the vehicle, wherein the perimeter is one of a full range perimeter and a returnable range perimeter responsive to a user perimeter type selection elicited and received via the display;

display the perimeter on the display;

identify at least one charging location within the perimeter responsive to a user charging stop number selection elicited and received via the display;

determine an extended perimeter indicating an extended travel range of the vehicle from the starting location based on a battery recharge at the at least one charging location based on a selected charging time elicited and received via the display, wherein the perimeter is one of a full range extended perimeter and a returnable range extended perimeter responsive to the user perimeter type selection elicited and received via the display;

display the extended perimeter on the display; and generate and display a map indicating one or more of the travel range and the extended travel range on the display.

17. The vehicle of claim 16, wherein the computer-executable instructions are further configured to cause the processor to:

elicit a first user input identifying one or more recharging stops to be considered in determining a total range of travel of the vehicle; and modify the map to show a total travel range of the vehicle upon charging the vehicle at the one or more recharging stops.

* * * * *